United States Patent [19]

Mukaida et al.

[11] 4,135,036

[45] Jan. 16, 1979

[54] PROCESS FOR PRODUCTION OF MAGNETIC RECORDING MEDIA AND RECORDING MEDIA

[75] Inventors: Yoshito Mukaida; Yasuyuki Yamada, both of Odawara; Shinichi Hirayama, Sagamihara; Hiroshi Suzuki; Yutaka Asakawa, both of Tokyo, all of Japan

[73] Assignees: Fuji Photo Film Co., Ltd., Minami-ashigara; Asahi Denka Kogyo K.K., Tokyo, both of Japan

[21] Appl. No.: 755,303

[22] Filed: Dec. 29, 1976

[30] Foreign Application Priority Data

Dec. 29, 1975 [JP] Japan ............................... 50/159258

[51] Int. Cl.² ............................................. H01F 10/02
[52] U.S. Cl. ................................... 428/413; 427/128; 428/474; 428/539; 428/900
[58] Field of Search ..................... 427/47, 48, 127–132; 428/900, 539; 252/62.54

[56] References Cited

U.S. PATENT DOCUMENTS

| 3,976,822 | 8/1976 | Thomas et al. ................... 427/128 X |
| 3,992,478 | 11/1976 | Kamosaki et al. ............... 428/474 X |

OTHER PUBLICATIONS

IBM Tech. Dis. Bull. Denk et al., p. 3858, 1971 (May), vol. 13, No. 12.

Primary Examiner—Bernard D. Pianalto
Attorney, Agent, or Firm—Sughrue, Rothwell, Mion, Zinn and Macpeak

[57] ABSTRACT

A process for producing a magnetic recording medium with a magnetic recording layer comprising coating a magnetic coating composition comprising mainly a ferromagnetic powder, a binder, and a predominantly aqueous coating solvent on a nonmagnetic support and then drying, wherein the binder contains a water-soluble or water-dispersible amide compound. In a particularly preferred embodiment, the binder also contains an epoxy compound containing on the average one or more adjacent epoxy groups in the molecule.

26 Claims, No Drawings

PROCESS FOR PRODUCTION OF MAGNETIC RECORDING MEDIA AND RECORDING MEDIA

BACKGROUND OF THE INVENTION

1. FIELD OF THE INVENTION

The present invention relates to a process for producing a magnetic recording member and more particularly, to a process for producing a magnetic recording medium with a magnetic recording layer provided thereon by coating.

2. DESCRIPTION OF THE PRIOR ART

Hitherto, a magnetic recording member with a magnetic recording layer provided thereon using a coating composition has been produced by the steps of thoroughly mixing a ferromagnetic powder, a binder resin, any additives, and an organic solvent using a dispersion mixer, coating the resulting mixture on a support, e.g., a plastic sheet, metal foil, paper, etc., and drying.

Recently, however, various problems such as increase in costs, danger of fire, pollution, etc., have arisen in using the above described method since the use of such an organic solvent has the disadvantages of supply, cost, air pollution, fire hazard, and harm to the human body in manufacturing.

As a method to eliminate the above problems, Japanese Patent Publication No. 46922/1974, and U.S. Pat. No. 2,699,408, for example, disclose a method in which a magnetic coating composition is prepared in the form of an aqueous emulsion. Although a synthetic resin aqueous emulsion and a water-soluble adhesive are used in this method, it has been impossible to employ this method in the production of precision magnetic tapes since sufficient dispersibility has not been obtained with these binders. In addition, this method can be used only where a non-magnetic support made of paper is employed, and cannot be utilized with non-magnetic supports, e.g., plastics, metal, ceramics, and the like.

SUMMARY OF THE INVENTION

Accordingly, an object of the present invention is to improve the above described disadvantages. A further object of the present invention is to provide a novel process for producing a magnetic recording medium in which no organic solvent needs to be used, and a water-soluble or water-dispersible binder is used.

Another object of the present invention is to provide a process for producing a magnetic recording medium with a magnetic recording layer comprising a water-soluble or water-dispersible binder showing good adhesion to any type of non-magnetic support.

A further object of the present invention is to provide a process for producing a magnetic recording medium with a magnetic recording layer which is composed of an aqueous emulsion and easily curable and curable to a high degree.

Another object of the present invention is to provide a process for producing a magnetic recording medium showing excellent wear-resistance.

An even further object of the present invention is to provide a process for producing a magnetic recording medium showing excellent heat-resistance.

A still further object of the present invention is to provide a process for producing a magnetic recording medium, which does not give rise to air pollution problems.

Another object of the present invention is to provide a process for producing a magnetic recording medium, in which the harm to humans is low or non-existent.

It has now been found that these objects are attained by employing as a binder for the magnetic recording medium, a binder containing a water-soluble or water-dispersible amide compound with a predominantly aqueous coating solvent and in a particularly preferred embodiment a binder containing (1) a water-soluble or water-dispersible amide compound and (2) an epoxy compound containing on the average one or more adjacent expoxy groups in the molecule with a predominantly aqueous coating solvent.

That is to say, the present invention provides a process for producing a magnetic recording medium with a magnetic recording layer which comprises coating a magnetic coating composition comprising mainly a ferromagnetic powder, a binder, and a predominantly aqueous coating solvent on a non-magnetic support, and then drying the coated layer, wherein the binder contains a water-soluble or water-dispersible amide compound.

In a particularly preferred embodiment of this invention, the invention provides a process for producing a magnetic recording medium with a magnetic recording layer which comprises coating a magnetic coating composition comprising mainly a ferromagnetic powder, a binder, and a predominantly aqueous coating solvent or a non-magnetic support and then drying the coated layer wherein the binder contains a water-soluble or water-dispersible amide compound and an epoxy compound containing on the average one or more adjacent epoxy groups in the molecule.

DETAILED DESCRIPTION OF THE INVENTION

The water-soluble or water-dispersible amide compounds which can be present in the binder used in the present invention are those in which the amide compound is soluble to an extent of or dispersible to an extent of 2% by weight in water at 25° C., respectively. Suitable specific examples of amide compounds are described below.

(I-1) Amide compounds obtained by reacting aliphatic carboxylic acids and/or their derivatives (e.g., alkyl esters having from 1 to 5 carbon atoms in the alkyl moiety such as the methyl ester, the ethyl ester, the propyl ester, the butyl ester, the pentyl ester etc.) with polyamino compounds under common, conventional condensation conditions:

(I-2) Acryl-modified amide compounds obtained by modifying the above amide compounds (I-1) with acrylic acid, methacrylic acid, or their derivatives (e.g., alkyl esters having from 1 to 5 carbon atoms in the alkyl moiety such as the methyl ester, the ethyl ester, the propyl ester, the butyl ester, the pentyl ester etc.).

(I-3) Expxy-modified amide compounds obtained by modifying the above amide compounds (I-1) with epoxy compounds;

(I-4) Acryl-epoxy-modified amide compounds obtained by modifying the above amide compounds (I-1) with acrylic acid, methacrylic acid, or their derivatives (e.g., alkyl esters having from 1 to 5 carbon atoms in the alkyl moiety such as the methyl ester, the ethyl ester, the propyl ester, the butyl ester, the pentyl ester etc.), and epoxy compounds;

(I-5) Amide compounds obtained by reacting maleic acid-modified unsaturated aliphatic carboxylic acids and polyamino compounds under common condensation conditions;

(I-6) Epoxy-modified amide compounds obtained by modifying the above amide compounds (I-5) with epoxy compounds;

(I-7) Amide compounds obtained by reacting a mixture of maleic acid-modified unsaturated aliphatic carboxylic acids and aliphatic carboxylic acids and/or their derivatives (e.g., alkyl esters having from 1 to 5 carbon atoms in the alkyl moiety such as the methyl ester, the ethyl ester, the propyl ester, the butyl ester, the pentyl ester, etc.), with polyamino compounds under common condensation conditions; and (I-8) Epoxy-modified amide compounds obtained by modifying the above amide compounds (I-7) with epoxy compounds.

The above compounds (I-1) to (I-8) are explained in more detail below (i) Amide Compounds (I-1):

Aliphatic carboxylic acids and/or their derivatives which can be used in preparing amide compounds (I-1), include saturated aliphatic carboxylic acids containing about 4 or more, preferably 4 to 22, carbon atoms, e.g., butyric acid, valeric acid, caproic acid, caprylic acid, capric acid, lauric acid, myristic acid, palmitic acid, sterric acid, arachic acid, behenic acid, and the like, and their derivatives; unsaturated aliphatic carboxylic acid containing about 10 or more preferably 10 to 20 carbon atoms, e.g., 4-decenoic acid, lauroleic acid, 4-tetradecenoic acid, 5-tetradecenoic acid, myristoleic acid, zoomaric acid, petroselinic acid, oleic acid, elaidic acid, linoleic acid, linoelaidic acid, eleostearic acid, linolenic acid, parinaric acid, arachidonic acid, and their derivatives; tall oil aliphatic carboxylic acids obtained from pulp waste and their esters (e.g., alkyl esters having from 1 to 5 carbon atoms in the alkyl moiety such as the methyl ester, the ethyl ester, the propyl ester, the butyl ester, the pentyl ester, etc.), drying oil, semi-drying oil, and polymerized aliphatic carboxylic acids, e.g., dimer acids, trimer acids, and the like, obtained by polymerization of free aliphatic carboxylic acids and their derivatives. As the above drying oils or semi-drying oils, soybean oil, linseed oil, tung oil, perilla oil, cotton seed oil, sunflower oil, dehydrated castor oil, and the like containing aliphatic carboxylic acids having a high degree of unsaturation, e.g., linoleic acid, linolenic acid, and the like, can be used.

On the other hand, preferred polyamino compounds, the other component used in preparing amide compounds (I-1), are those containing two or more primary and/or secondary amino groups in the molecule. For example, polyamino compounds represented by Formula (1) can be used,

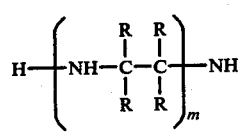

wherein R is a hydrogen atom or an alkyl group containing 5 or less carbon atoms (e.g., methyl, ethyl, propyl, butyl, pentyl, etc.), and m is an integer of 6 or less.

Preferred examples of these polyamino compounds are ethylenediamine, diethylenetriamine, triethylenetetramine, tetraethylenepentamine, pentaethylenehexamine, hexaethyleneheptamine, heptaethyleneoctamine, nonaethylenedecamine, di-1,2-propanetriamine, and the like.

Other polyamino compounds which can be used are those diamino compounds represented by Formula (2):

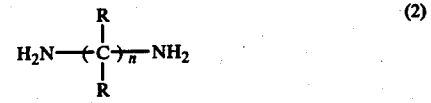

wherein R is a hydrogen atom or an alkyl group containing 5 or less carbon atoms (e.g., methyl, ethyl, propyl, butyl, pentyl, etc.), and n is an integer of 3 to 12.

Preferred examples of these diamino compounds are 1,3-propanediamine, 1,4-butanediamine, 1,5-pentanediamine, 1,6-hexanediamine, 1,7-heptanediamine, 1,8-octanediamine, and the like.

Amide compounds (I-1) can be produced by reacting aliphatic carboxylic acids and/or their derivatives, and polyamino compounds in a conventional manner, for example, at a temperature of about 150° to about 320° C., preferably 170° to 290° C., under ordinary pressure e.g., atmospheric. In order to carry out the reaction while distilling out water produced during the condensation reaction, the reaction may be carried out under reduced pressure if desired.

As aliphatic carboxylic acids and/or their derivatives, polymerized aliphatic carboxylic acids, saturated aliphatic carboxylic acids, and unsaturated aliphatic carboxylic acids are especially preferred. In the reaction of a polyamino compound represented by Formula (1) and an aliphatic carboxylic acid and/or its derivative, an imidazoline ring can be formed through a two-molecular dehydration condensation at a temperature of about 250 to about 300° C., for a reaction time of from about 1 to about 10, preferably from 2 to 3, hours.

(ii) Acryl-modified Amide Compounds (I-2):

Acryl-modified amide compounds (I-2) can be produced by modifying the above amide compounds (I-1) with acrylic acid, methacrylic acid, or the derivatives thereof, for example, alkyl esters (e.g., having from 1 to 5 carbon atoms in the alkyl moiety such as the methyl ester, the ethyl ester, and the like).

The modification can be carried out by mixing an amide compound, and acrylic acid, methacrylic acid or the derivative thereof in such a ratio (e.g., an about equivalent ratio or less to the amide compound) that the modified compound after the modification contains active hydrogen atoms, and reacting the resulting mixture at a temperature of about 40 to 120° C. preferably 50 to 80° C., for from about 1 to about 3 hours.

(iii) Epoxy-modified Amide Compounds (I-3)

Epoxy-modified amide compounds (I-3) can be produced by modifying the above amide compounds (I-1) with an epoxy compound.

Epoxy compounds which can be used include those compounds, which are liquid at room temperature (about 20–30° C.) of the compounds listed hereinafter as epoxy compounds (II) alkylene oxides (e.g., in which the alkylene moiety has 2 to 5 carbon atoms.) such as propylene oxide and the like, butyl glycidyl ether, propyl glycidyl ether, cetyl glycidyl ether, glycidyl ether of phenol or cresol, glycidyl ether of an ether obtained by additon of an alkylene oxide e.g., as described above, to phenol, glycidyl ether of propylene glycol, glycidyl esters such as glycidyl methacrylate; etc.

The modification can be carried out by mixing an amide compound (I-2) and a epoxy compound in such a ratio that the modified compound after the modification contains active hydrogen atoms e.g., where the epoxy compound (II) is present in an amount about equivalent to or less than that of the amide compound (I-1) and reacting the resulting mixture at a temperature of about 40 to 120° C., preferably 50 to 80° C., for about 1 to about 3 hours.

(iv) Acryl-Epoxy-modified Amide Compounds (I-4),

Acryl-epoxy-modified amide compounds can be produced by modifying the above amide compounds (I-1) with acrylic acid, methacrylic acid, or the derivative thereof, and an epoxy compound. Acrylic acid, methacrylic acid, or the derivatives thereof, and epoxy compounds as herein used may be the same as used, respectively, in producing the acryl-modified compounds (I-2), and the epoxy-modified amide compounds (I-3), and the modification is carried out in the same manner as used in the production of amide compounds (I-2) and (I-3).

(v) Amide Compounds (I-5):

Amide compounds (I-5) can be produced by reacting maleic acid-modified unsaturated aliphatic carboxylic acids and polyamino compounds under conventional condensation conditions.

The above maleic acid-modified unsaturated aliphatic carboxylic acids are obtained by reacting 100 parts by weight of unsaturated aliphatic carboxylic acids having an iodine value of not less than about 20, to about 4 to about 60 parts by weight of maleic anhydride to produce maleinated unsaturated aliphatic carboxylic acids, and then opening about 90% of the acid anhydride groups contained in the maleinated unsaturated aliphatic carboxylic acids using monohydric alcohols.

Unsaturated aliphatic carboxylic acids having an iodine value of not less than about 20 include 4-decenoic acid linderic acid, lauroleic acid, 4-tetradecenoid acid, 5-tetradecenoic acid myristoleic acid, zoomaric acid, petroselinic acid, oleic acid, elaidic acid, linolic acid, linoelaidic acid, elecstearic acid, linolenic acid, parinaric acid, arachidonic acid, tall oil aliphatic carboxylic acid obtained from pulp wastes, drying oil, semi-drying oil, and polymerized aliphatic carboxylic acids such as dimer acids, trimer acids, and the like obtained by polymerization of free aliphatic carboxylic acids.

As the above drying oil and semi-drying oil, soybean oil, linseed oil, tung oil, perilla oil, cotton seed oil, sunflower oil, safflower oil. and dehydrated castor oil, each containing aliphatic carboxylic acids having a high degree of unsaturation, etc., linolic acid, linolenic acid, and the like, can be used.

As the monohydric alcohols, aliphatic monohydric alcohols containing 1 to 20 carbon atoms are preferably used, and examples of these alcohols include methyl alcohol, ethyl alcohol, n-propyl alcohol, n-butyl alcohol, n-amino alcohol, n-hexylalcohol, n-heptyl alcohol, n-octyl alcohol, n-nonyl alcohol, n-decyl alcohol, lauryl alcohol, myristyl alcohol. cetyl alcohol, stearyl alcohol, and alkylene oxide (e.g., in which the alkylene moiety has 2 to 5 carbon atoms, such as ethylene oxide, propylene oxide, and the like) adducts of the above 1 to 20 carbon atom containing aliphatic monohydric alcohols, etc. In addition, as the monohydric alcohols, aliphatic monohydric alcohols obtained through the well known oxo process can be used.

Polyamino caompounds to be used for the reaction with the above maleic acid-modified unsaturated aliphatic carboxylic acids can be the same as used in preparing the above amide compounds (I-1), and the reaction can be carried out in the same manner as used in preparing the amide compounds (I-1).

(vi) Epoxy-modified Amide Compounds (I-6):

Epoxy-modified amide compounds can be produced by modifying the above amide compounds (I-5) with an epoxy compound.

The epoxy compounds as herein used can be the same as used in preparing the above epoxy-modified amide compounds (I-3), and the modification can be carried out in the same manner as used in the epoxy-modified amide compounds (I-3).

(vii) Amide Compounds (I-7):

Amide compounds can be produced by reacting a maleic acid-modified unsaturated aliphatic carboxylic acid, and aliphatic carboxylic acid or the derivative thereof, with a polyamino compound under conventional condensation reaction conditions.

Maleic acid-modified unsaturated aliphatic carboxylic acids as herein used can be the same as used in preparing the above amide compound (I-5), and the aliphatic carboxylic acid or the derivative thereof can be the same as used in preparing the above amide compounds (I-1), Furthermore, the polyamino compounds for use in the reaction with the above carboxylic acid component can be the same as used in preparing the above amide compounds (I-1). The reaction can be carried out in the same manner as used in the production of the amide compounds (I-1).

(viii) Epoxy-modified Amide Compounds (I-8):

Epoxy-modified amide compounds can be produced by modifying the epoxy-modified amide compounds (I-7) with an epoxy compound.

The epoxy compounds which can be used herein can be the same as used in preparing the above epoxy-modified amide compounds (I-3), and the reaction can be carried out in the same manner as used in preparing the epoxy-modified amide compound (I-3).

The above amide compounds (I-1) to (I-8) have properties such as water-solubility or water-dispersibility, and at the same time, act as curing agents or cross-linking agents for epoxy compounds (II), as hereinafter described, used in the second embodiment of the invention. Therefore, it is not necessary to add curing agents for the epoxy compounds (II), but, if desired, conventional curing agents may be used.

The water-soluble or water-dispersible amide compounds of the present invention have the characteristic that the aqueous solution containing the amide compound changes to an emulsion when an excess of water as a solvent is added thereto. A suitable amount of the water-soluble or water-dispersible amide compounds in the binder is at least about 30 wt % or higher (e.g., about 30 wt % to about 100 wt % of the total binder composition weight.

Examples of epoxy compounds (II), which can be used in the second embodiment of this invention include any epoxy compound which contains on the average one or more adjacent epoxy groups in the molecule and which is water-solubilite or water-dispersible when added to a coating solvent together with the above amide compounds (I). A suitable weight ratio of the amide compound (I) to the epoxy compound (II) in this embodiment can range from about 3:1 to 7:3. A suitable amount of the epoxy compound (II) in this enbodiment can be up to about 70 wt % or less based on the total binder composition weight. Representative examples of these Epoxy Compound (II) are disclosed below and in U.S. Pat. No. 3,950,451.

(II-1) Eposy compounds produced from active hydrogen-containig compounds and an epihalohydrin (e.g., epichlorohydrin, epibromohydrin, etc.)

(a) Polyglycidyl ethers of polyhydric phenols (e.g., as described in U.S. Pat. No. 3,950,451) or polyhydric phenol-alkylene oxide (e.g., in which the alkylene moiety has 2 to 5 carbon atoms) adducts, e.g., diglycidyl ethers of bisphenol A, diglycidyl ethers of bisphenol A-ethylene oxide and/or propylene oxide adducts, etc.

(b) Polyglycidyl ethers of hydrogenated polyhydric phenols or polyhydric phenol-alkylene oxide adducts, e.g., diglycidyl ether of hydrogenated bisphenol A, etc.

(c) Polyglycidyl ethers of novolak resins, e.g., those represented by the formula:

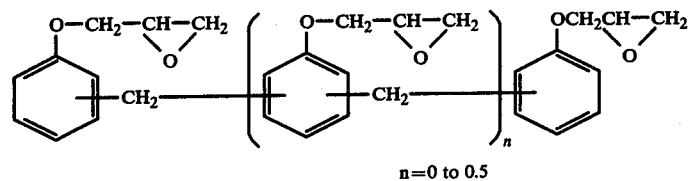

, etc.

(d) Polyglycidyl ethers of polyhydric alcohols e.g., triglycidyl ether of glycerin, diglycidyl ether of 1,6-hexenediol, etc.

(e) Diglycidyl ethers of silicon-containing polyhydric alcohols, e.g., those represented by the formula:

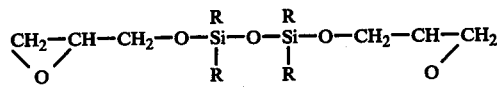

R = an alkyl group (e.g., having 1 to 5 carbon atoms) etc.

(f) Polyglycidyl esters of aromatic carboxylic acids, i.e., phthalic acid, terephthalic acid, isophthalic acid, trimellitic acid, pyromellitic acid, etc., for example, those represented by the formula:

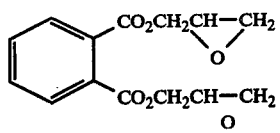

etc.

(g) Polyglycidyl compounds of amines or amides e.g., amines an amides as disclosed in U.S. Pat. No. 3,950,451, for example, those represented by the formula:

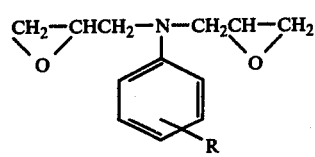

R = a hydrogen atom or an alkyl group e.g., having 1 to 5 carbon atoms),
, those represented by the formula:

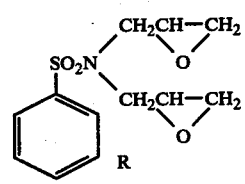

wherein R is a hydrogen atom or an alkyl group, e.g., having 1 to 5 carbon atoms etc.

(h) Hydantoin ring-containg epoxy compounds, e.g., those represented by the formula:

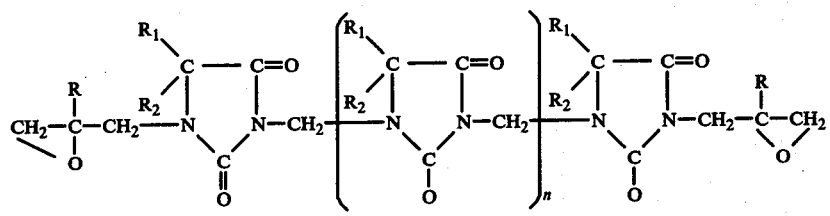

wherein R, $R_1$, and $R_2$ each is a hydrogen atom or an alkyl group containing 1 to 4 carbon atoms (e.g., methyl, ethyl, propyl, butyl etc.), and n is a number of not less than 0.1, etc.

(II-2) Peracid oxidation type epoxy compounds (a) Epoxides of alkadienes e.g., having 1 to 5 carbon atoms) e.g., butadienedioxide, etc.

(b) Epoxides of cycloalkenes, e.g., those represented by the following formulae:

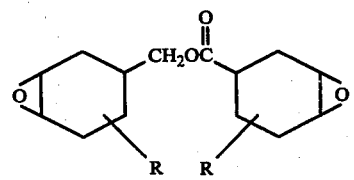

where R is a hydrogen atom or an alkyl group, e.g., having 1 to 5 carbon atoms)

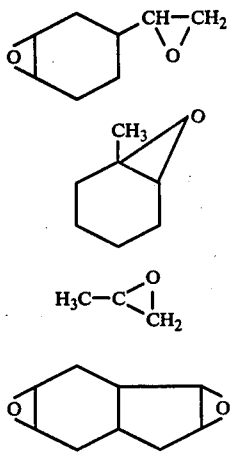

, etc.

(c) Epoxy compounds produced from polybutadiene (II-3) Urethane-modified epoxy compounds, e.g., liquid urethane-modified epoxy compounds obtained by reacting a liquid epoxy compound containing one or more adjacent epoxy groups and OH groups on the average at least 0.1 and a terminal isocyanate group-containing urethane prepolymer containing 1 to 10% of NCO groups produced from a polyether (e.g., adducts of glycols such as ethylene glycol, propylene glycol, glycerin, etc.,) and alkylene oxides such as ethylene oxide, propylene oxide, etc.) or polyester (e.g., reaction products of glycols such as ethylene glycol, propylene glycol, glycerin, etc., and dicarboxylic acids such as adipic acid, sebasic acid, terephthalic acid, etc.) having a hydroxy equivalent of about 70 to about 1,500 and a molecular weight of about 700 to about 4,000, and polyisocyanate, the liquid epoxy compound and the terminal isocyanate groups containing urethane prepolymer reacting, in such a ratio that the OH/NCO ratio is more than about 1.

In addition, as a binder component of the magnetic coating composition, other resins which are water-soluble or water-dispersible can be used together with the epoxy compounds (II) Where the water-soluble or water-dispersible amide compound (I) is used alone, a suitable amount of these water-soluble or water-dispersible resins can range up to 70% by weight based on the amide compound (I) and where the water-soluble or water-dispersible compound (I) is used with the epoxy compound (II), a suitable amount of these other water-soluble or water-dispersible compounds can range up to 70% by weight based on the epoxy compound (II.)

In greater detail, the following resins can be used. As water-soluble resins, natural polymer compounds such as corn starch, sodium alginate, gum arabic, dextrin, gelatin, collagen, and the like: semi-synthetic polymer compounds such as methyl cellulose, hydroxymethyl cellulose, carboxymethyl starch, and the like; synthetic polymer compounds such as polyvinyl alcohol, sodium polyacrylate, polyethylene oxide, water-soluble melamine resins, amine- neutralized alkyd resins, phenol-formaldehyde resins, and the like, etc., can be used.

As water-dispersible resins, a vinyl chloride/vinyl acetate copolymer, a vinyl chloride/vinylidene chloride copolymer, a vinyl chloride/acrylonitrile copolymer, an acrylate/acrylonitrile copolymer, an acrylate/vinylidene chloride copolymer, an acrylate/styrene copolymer, a methacrylate/vinylidene chloride copolymer, a methacrylate/styrene copolymer, urethane latexes, urethane elastomers, polyamide resins, silicone resins, cellulose derivatives, polyvinyl fluoride, a vinylidene chloride/acrylonitrile copolymer, a butadiene/acrylonitrile copolymer, polyvinyl butyral, a styrene/butadiene copolymer, polyester resins, emulsions of various synthetic rubbers, and the like can be used.

As a coating solvent as herein used, water is preferably used, and water-soluble or water-miscible organic solvents can be mixed with water, e.g., up to about 50 wt %, preferrably less than 30 wt %, of the coating solvent as long as the advantages of the present invention are not deteriorated. Preferred examples of these organic solvents are alcohols, ketones, esters, ethers, hydrocarbon, amines, acids, and the like. Specific examples of these organic solvents are methanol, ethanol, propanol, butanol, acetone, methyl ethyl ketone, acetylacetone, ethyl acetate, etc.

In the present invention, a ferromagnetic powder is mixed with the above binder, and the coating solvent to form a magnetic coating composition. A suitable amount of the coating solvent can range from about 50 to about 500, preferably 70 to 300, parts by weight to 100 parts by weight of the ferromagnetic powder.

Ferromagnetic iron oxides, ferromagnetic chromium dioxide, ferromagnetic alloy powder and the like can be used as the ferromagnetic powder.

The above ferromagnetic iron oxides are ferromagnetic iron oxides having the formula $FeO_x$ in which is $1.33 \leq x \leq 1.50$ i.e., maghemite ($\alpha\text{-}Fe_2O_3$, x=1.50), magnetite ($Fe_3O_4$, x=1.33), and the berthollide compounds thereof ($FeO_x$, $1.33 < x < 1.50$). The above x value is determined by the following equation:

$$y = \frac{1}{2 \times 100} \times \left\{ 2 \times \left(\begin{array}{c}\text{atomic \% of}\\ \text{divalent iron}\end{array}\right) + 3 \times \left(\begin{array}{c}\text{atomic \% of}\\ \text{trivalent iron}\end{array}\right)\right\}$$

Divalent metals may be added to these ferromagnetic iron oxides. These divalent metals include Cr, Mn, Co, Ni, Cu, Zn, and the like, and they added in an amount of 0 to about 10 atomic % based upon the above iron oxide.

As the above ferromagnetic chromium dioxide, $CrO_2$, and $CrO_2$ containing metals such as Na, K, Ti, V, Mn, Fe, Co, Ni, Tc, Ru, Sn, Ce, Pb, and the like, semiconductive materials such as P, Sb, Te, and the like, or the oxides thereof in an amount of 0 to about 20 atomic % can be used.

The effective needle-like ratio and average length of the above ferromagnetic iron oxide and ferromagnetic chromium dioxide is respectively about 2:1 to 20:1 and about 0.2 to about 2.0 μm.

The above ferromagnetic alloy powder comprises a metal component in an amount of at least about 75 wt. %, and 80 wt % or more of the metal component is at least one ferromagnetic metal (i.e., Fe, Co, Ni, Fe—Co, Fe—Ni, Co—Ni, or Co—Ni—Fe), while about 20 wt. % or less, preferably 0.5 to 5 wt.%, comprises Al, Si, S, Sc, Ti, V, Cr, Mn, Cu, Zn, Y, Mo, Rh, Pd, Ag, Sm, Sb, Te, Ba, Ta, W, Re, Au, Hg, Pb, Bi, La, Ce, Pr, Nd, B, P, and the like. The alloy powder sometimes contains a small amount of water, hydroxides and oxides.

With the above ferromagnetic alloy powder, a particle generally has a length of about 50 to 1,000 Å, and about 2 to about 20 particles are chained together to form a needle-like particle.

The above ferromagnetic powders are described in Japanese Patent Publication Nos. 5515/1961, 4825/1962, 5009/1964, 14090/1969, 18372/1970, 22062/1972, 22513/1972, 28466/1971, 38755/1971, 4286/1972, 12422/1972, 17284/1972, 18509/1972, 18573/1972, 39639/1973, U.S. Pat. Nos. 3,026,215, 3,031,341, 3,100,194 3,242,005, 3,389,014, British Patent Nos. 752,659, 782,762, 1,0073323, French Patent No. 1,107,654, West German Patent Application (OLS) No. 1,281,334, etc.

A suitable ratio of the above ferromagnetic powder to the binder component is about 8 to about 400 parts by weight per 100 parts by weight of the ferromagnetic powder, and a preferred is 10 to 200 parts by weight per 100 parts by weight of the ferromagnetic powder. A particularly preferred range is 20 to 100 parts by weight per 100 parts by weight of the ferromagnetic powder.

Where the amount of the binder component is below about 15 parts by weight, an effective magnetic recording layer is not formed, whereas above about 100 parts by weight, the packing density of the magnetic particles is so decreased that effective magnetic recording is sometimes not attained.

In the present invention, as described above, since the binder component is water-soluble or water-dispersible, the addition of surface active agents is not necessarily needed. They may be, however, added as dispersing agents for the ferromagnetic powder and antistatic agents for the magnetic recording layer.

Any of the anionic surface active agents, cationic surface active agents, amphoteric surface active agents, and nonionic surface active agents can be used as surface active agents. They may be used individually or in combination with each other. Additives for the magnetic recording layer, e.g., lubricants, abrasives, antistatic agents, and the like can also to the magnetic coating composition of the present invention.

Lubricants which can be used in the present invention, include silicone oils such as dialkyl polysiloxane (alkyl, $C_1$ to $C_5$), dialkoxy polysiloxane (alkoxy: $C_1$ to $C_4$), monoalkylmonoalkoxy polysiloxane (alkyl: $C_1$ to $C_5$: alkoxy: $C_1$ to $C_4$), phenyl polysiloxane, fluoroalkyl polysiloxane (alkyl: $C_1$ to $C_5$), and the like; electrically conductive fine powders such as carbon black, graphite, carbon black-grafted polymers, and the like; inorganic fine powders such as molybdenum disulfide, tungsten disulfide, and the like; synthetic resin fine powders such as polyethylene, polypropylene, a polyethylene-vinyl chloride copolymer, polytetrafluoroethylene, and the like: α-olefin polymers: unsaturated aliphatic hydrocarbons which are liquid at ordinary temperature (those compounds containing an-olefin double bond connected to the terminal carbon, and containing about 20, preferably 12 to 22 carbon atoms); aliphatic acid esters of monobasic aliphatic carboxylic acids containing 12 to 20 carbon atoms and monohydric alcohols containing 3 to 12 carbon atoms; etc.

These lubricants can be used in an amount of about 0.2 to about 20 parts by weight per 100 parts by weight of the binder.

These lubricants are described in detail in Japanese Patent Publication Nos. 23889/1968, 40461/1971, 15621/1972, 18482/1972, 28043/1972, 30207/1972, 32001/1972, 7442.1973, 14247/1974, 5042/1975, U.S. Pat. Nos. 3,470,021, 4,492,235, 3,497,411, 3,523,086, 3,625,760, 3,630,772, 3,634,253, 3,642,539, 3,687,725, *IBM Technical Desclosure Bulletin*, Vol. 9, No. 7, page 779 (Dec. 1966), *ELEKTRONIK*, No. 12 page 380 (1961), etc.

Commonly used materials can be used as abrasives and examples include fused alumina, silicon carbide, chromium oxide, corundum, synthetic corundum, diamond, synthetic diamond, garnet, emery (main component: corundum and magnetite), and the like, These abrasives suitably have a Moh's hardness of at least about 5, and those having an average particle diameter of 0.05 to 5μ, preferably 0.1 to 2μ, are generally used.

These abrasives can be employed in an amount of 0.5 to about 20 parts by weight per 100 parts by weight of the binder.

These abrasives are described in detail in Japanese Patent Publication Nos. 18572/1972, 15003/1973, 15004/1973, (U.S. Pat. No. 3,617,378), 39402/1972, 9401/1975, U.S. Pat. Nos. 3,007,807, 3,041,196, 3,293,066, 31630,910, 3,687,725, British Patent No. 1,145,349, West German Patent Nos. 853,211, 1,101,000, etc.

Electrically conductive powders such as carbon black, graphite, carbon black-grafted polymers, and the like can be employed in a proportion of about 0.2 to about 20 parts by weight per 100 parts by weight of the binder as antistatic agents.

These antistatic agents are described in detail in Japanese Patent Publication Nos. 2613/1965, 22726/1971, 24881/1972, 26882/1972, 15440/1973, 26761/1973, 3,642/1975, U.S. Pat. Nos. 2,804,401, 3,293,066, 3,647,539, British Patent No. 793,520, *IBM Technical Desclosure Bulletin*, Vol, 6, No. 12, Page 4 (May 1964), etc.

The formation of the magnetic recording layer of the present invention is attained by the steps of kneading and dispersing the above composition to form a water-soluble or water-dispersible binder type magnetic coating composition, coating the coating composition on a non-magnetic support, and finally drying the coated layer. In the period between the coating of the magnetic recording layer and the drying thereof, an orientation treatment of the ferromagnetic powder in the magnetic recording layer can be applied, and also, after the drying, a surface-smoothening treatment of the magnetic layer can be used.

Materials which can be used as non-magnetic supports in the present invention include polyesters such as polyethyleneterephthalate, polyethylene-2, 6-naphthalate, and the like, polyolefins such as polyethylene, polypropylene and the like, cellulose derivatives such as cellulose triacetate, cellulose diacetate, cellulose acetate butyrate, and the like, plastics such as polycarbonate, polyvinyl chloride, polyamides, polyimides, and the like, ceramics such as glass, porcelain, earthenware, and the like, paper, non-magnetic metals such as Cu, Al, Zn, and the like, etc.

The thickness of these non-magnetic supports is generally about 2 to 50 μm, preferably 3 to 25 μm in the form of a film, a tape, and a sheet, and as large as about 0.5 to 10 mm in the form of a disc and a card. In the form of a drum, they are cyrindrical. These types are chosen depending upon the kind of recorder to be used.

In the case of a film, a tape, a sheet, a thin flexible disc, and the like, the opposite surface of the side on which the magnetic layer is provided, may be backcoated for the purpose of preventing charging, transferring, wow and flutter, and the like.

This backcoating is described in U.S. Pat. Nos. 2,804,401, 3,293,066, 3,617,378, 3,062,676, 3,734,772, 3,476,596, 2,643,048, 2,803,556, 2,887,462, 2.923,642,2,997,451, 3 007, 892, 3,041,106, 3,115,420, 3,166,688, 3,761,311, etc.

In kneading the magnetic powder and the above components, they can be placed into a mixer, all at the same time or individually. For instance, the magnetic powder can be first added to a solvent containing a dispersing agent, and the resulting mixture can be then kneaded for a predetermined period to produce a magnetic composition.

In kneading and dispersing the magnetic coating solution, various kinds of kneaders are used. For instance, a two-roll mill, a three roll mill, a ball mill, a pebble mill, a tromel, a sand grinder, a Szegvari attritor, a high-speed impeller disperser, a high-speed stone mill, a high-speed impulse mill, a disperser, a kneader, a high-speed mixer, a homogenizer, a supersonic disperser, and the like can be used.

Techniques on kneading and dispersing are described in T. C. Patton, *Paint Flow and Pigment Dispersion*, John Wiley & Sons Co., Ltd., (1964), and also in U.S. Pat. Nos. 2,581,414, 2,855,156, etc.

Suitable methods for coating the above magnetic recording layer on a non-magnetic support include air doctor coating, blade coating, air knife coating, squeeze coating, dip coating, reverse roll coating, transfer roll coating, gravure coating, kiss coating, cast coating, spray coating, etc., and also other methods can be used. These methods are described in detail *Coating Kogaku* (*Coating Engineering*), pages 253 to 277, published by Asakura Shoten, (March 20, 1971).

The magnetic recording medium of the present invention is produced by providing a magnetic layer on a non-magnetic support using the above coating method. By repeating this procedure, two magnetic layers can be provided. Also, as described in Japanese Patent Application (OPI) Nos. 98803/1973 (West German Patent Application (OLS) No. 2,309,159) and 99233/1973 (West German Patent Application Publication No. 2,309,158), etc., two magnetic layers may be provided at the same time using a multilayer simultaneous coating method.

The magnetic layer provided on the support by the above method, after being subjected to an orientatation treatment to orient the magnetic powder in the layer, is dried. Then, after being subjected to a surface-smoothening processing, if necessary, and being cut to the desired shape, the magnetic recording medium of the present invention is obtained. In particular, it has been found that the application of the surface-smoothening processing provides a magnetic recording medium having a smooth surface and excellent wear-resistance.

In the orientation treatment, the magnetic field of orientation can be a D.C. or A.C. field and have a field strength as high as about 500 to 2,000 gauss. A suitable drying temperature for the magnetic layer is about 50 to about 120° C., prefarably 70 to 100° C., and especially preferably 80 to 90° C.; the drying air flow rate can be about 1 to about 5 Kl/m$^2$, preferably 2 to 3 Kl/m$^2$; and the drying period generally is about 30 seconds to about 10 minutes, preferably 1 to 5 minutes.

The direction of orientation of magnetic substances is determined depending upon the use of the magnetic recording medium. That is, in the case of sound tape, miniature video tape, memory tape, and the like, the direction of orientation is parallel to the lengthwise direction of tape, and in the case of a videotape for broadcasting, and the like, the orientation is applied at an angle of about 30 to about 50° relative to the lengthwise direction of the tape.

Methods of orientating the magnetic powder are described in U.S. Pat. Nos. 1,949,840, 2,796,356, 3,001,891, 3,172,776, 3,416,949, 3,473,960, 3,681,138, Japanese Patent Publication Nos. 3427/1957, 28368/1964, 23624/1965, 23625/1965, 13181/1966, 13034/1973, 39722/1973, etc.

Moreover, as described in West German Patent Publication No. 1,190,985, the lower layer and upper layer may be oriented in opposite directions.

As the surface-smoothening treatment, a method to plane the surface with a smoothening sheet, calendering, or the like, a method to plane the surface using a metal brush, synthetic fiber brush, natural fiber brush, or the like, a method to grind the surface using a grinding sheet, or the like, etc., can be used in the present invention.

In the case of calendering, it is preferred to employ a super calendering method in which the medium is passed between two rolls, e.g., a metal roll and a cotton roll, synthetic resin (e.g., nylon) roll, or the like. The supercalendering is preferably carried out under the conditions of a pressure between rolls of about 25 to about 80 Kg/cm, preferably 30 to 50 Kg/cm, a temperature of about 35 to about 100° C., preferably 40 to 80° C., and a processing rate of 5 to 120 m/min. Where the temperature and pressure are above the upper limits described above, the magnetic lever and non-magnetic support are adversely influenced. Also, where the processing rate is more than about 5 m/min., a sufficient smoothening of the surface is not obtained, and above about 120 m/min., the operation becomes difficult.

Surface-smoothening processings are described in U.S. Pat. Nos. 2,688,567, 2,998,325, 3,783,023, West German Patent Application (OLS) No. 2,405,222, Japanese Patent Application (OPI) Nos. 53631/1974 and 10337/1975.

A wide magnetic tape with the surface provided as described above is then slit into the desired widths, e.g., 2 in., ¾ in., ½ in., ¼ in., 3.81 m/m, etc., or cut or stroked (punched out) into various dimensions, e.g., rectangular, square, circular, and the like, depending upon the use thereof.

With the magnetic recording medium of the present invention, as described above, a magnetic recording layer is provided by coating a novel magnetic coating composition in which a water-soluble or water-dispersible binder is used. Thus, it is possible to provide a magnetic recording medium having excellent wear-resistance and heat-resistance, and suitable for preventing pollution without using a large amount of organic solvent or using any organic solvent at all.

The present invention is based upon the discovery that aqueous magnetic coating compositions containing the above described amide compounds (I) have excellent ferromagnetic powder-dispersibility, and further that the magnetic recording medium of the present invention has excellent characteristics such as orientation properties, surface properties, and the like as compared with those prepared by coating organic solvents.

Also, it has been confirmed that addition of the above described epoxy compound (II) to the magnetic coating composition prepared using the above amide compound (I) provides magnetic media having excellent water-resistance and wear-resistance, and thus that the magnetic recording medium of the present invention is superior in all characteristics to those prepared by coating using organic solvents.

Furthermore, it has been confirmed that other resins which are water-soluble or water-dispersible can be used in combination with the above described resins.

Hereinafter, the present invention will be explained in greater detail by reference to the following examples and comparison examples. It will be easily understood by one skilled in the art that the components, ratios, procedural order, and the like shown below can be changed without departing from the spirit of the present invention.

Thus the present invention is not to be construed as being limited to the following examples. All parts, percents, ratios and the like are by weight, unless otherwise indicated.

Preparation of Amide Compound (I-1)

50 parts of tall oil aliphatic carboxylic acid, 200 parts of dimer acid (acid value 190 produced by Daiichi General Co., Ltd), and 148 parts of triethylenetetramine were placed in a flask equipped with a thermometer and a condenser, and reacted at 170 to 180° C. for 2 hours. The reaction temperature was increased to 280 to 305° C. while passing $N_2$ gas over the reaction system. The reaction was conducted for 4 hours at this temperature. On complete removal of the water, 358 parts of Amide Compound (I-1a) was obtained.

Preparation of Acryl-modified Amide Compound (I-2)

Twenty eight parts of stearic acid, and 235 parts of pentaethylenehexamine were placed in a reaction vessel equipped with a thermometer and a condenser, and reacted at 155 to 170° C. for 2 hours and furthermore reacted in a stream of nitrogen gas at 280 to 310° C. for 2 hours. On removal of water, 480 parts of Amide Compound (I-1b) was obtained.

To 100 parts of Amide Compound (I-1b) so obtained was added 5 parts of acrylic acid, and the mixture was reacted at 80° C. for 4 hours. Thus Acryl-modified Amide Compound (I-2a) was obtained.

Preparation of Epoxy-modified Amide Compound (I-3)

To 100 parts of Amide Compound (I-1b) obtained above was added 20 parts of an epoxy compound having an epoxy equivalent of 320 which was prepared by reaching propylene oxide with phenol in an equimolar ratio to obtain in adduct thereof and then glydicyl-etherizing the adduct (Adeka Resin ED-510, produced by Asahi Denka Kogyo K.K.). The resulting mixture was reacted at 80° C. for 3 hours, and thus Epoxy-modified Amide Compound (I-3a) was obtained.

Preparation of Acryl-Epoxy-modified Amide Compound (I-4)

To 100 parts of Amide Compound (I-1a) obtained as above were added 25 parts of diglycidyl ether of a polyether produced by reacting 2,2-bis(4-hydroxyphenyl)-propane and propylene oxide, (Adeka Resin EP-4000, produced by Asahi Denka Kogyo K.K., epoxy equivalent 320) and 5 parts of methacrylic acid. The resulting mixture was reacted at 80° C. for 3 hours, and thus Acryl-Epoxy-modified Amide Compound (I-4a) was obtained.

Preparation of Amide Compound (I-5)

One hundred parts of tall oil aliphatic carboxylic acid having an iodine value of 120 and 20 parts of maleic anhydride were placed in a four-necked flask, and reacted in a stream of nitrogen at 210° C. ± 10° C. for 8 hours. On distilling away the excess of maleic anhydride at 100 to 200° C. and 5 mmHg, 110 parts of maleinated tall oil aliphatic acid having an iodine value of 92 was obtained. To 100 parts of this maleinated tall oil aliphatic acid was added 33 parts of a monohydric alcohol, Oxocol 1415 (a synthetic higher alcohol comprising a 1:1 by weight mixture of myristyl alcohol and pentadecyl alcohol produced by Nissan Chemicals Industries Co., Ltd.) in a stream of nitrogen at 100° C., which were then reacted for 1 hour. Thus a maleic acid-modified product of tall oil aliphatic carboxylic acid having an iodine value of 180 was obtained.

To 100 parts of this maleic acid-modified product of tall oil aliphatic carboxylic acid was added 150 parts of tetraethylenepentamine, and the system was reacted at 170 to 180° C. for 2 hours and furthermore in a stream of nitrogen at 280 to 305° C. for 4 hours. On removal of water, Amide Compound (I-5a) was obtained.

Preparation of Epoxy-modified Amide Compound (I-6)

To 100 parts of Amide Compound (I-5a) obtained above as was added 35 parts of a bisphenol-A type epoxy resin (Adeka Resin EP-4100, produced by Asahi Denka Kogyo Co., Ltd., epoxy equivalent 190) as an epoxy compound, which were then reacted at 80° C. for 3 hours, and thus Epoxy-modified Amide Compound (I-6a) was obtained.

Preparation of Amide Compound (I-7)

To 200 parts of a maleic acid-modified product of tall oil aliphatic carboxylic acid, intermediate product in the production of Amide Compound (I-5a), was added 50 parts of tall oil aliphatic carboxylic acid, and furthermore 350 parts of tetraethylenepentamine, which were then reacted at 170 to 180° C. for 2 hours and furthermore in a stream of nitrogen at 280 to 305° C. for 4 hours. Thus Amide Compound (I-7a) was obtained.

Preparation of Epoxy-modified Amide Compound (I-8)

To 100 parts of Amide Compound (I-7a) as obtained above was added 35 parts of a bisphenol-A type epoxy compound (Adeka Resin EP-4100, produced by Asahi Denka Kogyo K.K., epoxy equivalent 190) as an epoxy compound, which were then reacted at 80° C. for 3 hours. Thus Epoxy-modified Amide Compound (I-8a) was obtained.

EXAMPLE 1

| Magnetic Coating Composition A | parts |
|---|---|
| Maghemite ($\gamma$-$Fe_2O_3$, Hc=325 Oe, average particle length=0.43 $\mu$m, acicular ratio=7:1) | 300 |
| Amide Compound (see Table 1) | 100 |
| Distilled Water | 600 |

These ingredients were mixed and dispersed in a ball mill. This Magnetic coating composition A was coated on a 23 $\mu$m thick polyethyleneterephthalate film in a dry thickness of 10 $\mu$m by doctor coating. The coated layer was subjected to a magnetic field orientation in a D.C. magnetic field of 1800 Oe for 0.5 seconds, dried for 5 minutes using air at 95° C. and 3.3 Kg/m², and then slit to ½ inch widths whereby magnetic tapes were obtained. These samples are designated Sample Nos. A-1 to A-8.

The amide compounds used in each sample are shown in Table 1.

Table 1

| Sample No. | Amide Compound in Magnetic Coating Composition A |
|---|---|
| A-1 | I-1a |
| A-2 | I-2a |
| A-3 | I-3a |
| A-4 | I-4a |
| A-5 | I-5a |
| A-6 | I-6a |
| A-7 | I-7a |
| A-8 | I-8a |

COMPARATIVE EXAMPLE 1

A magnetic tape was obtained using the following Magnetic Coating Composition I in place of Magnetic Coating Composition A of Example 1 and in the same manner as in Example 1. This magnetic tape is designated Sample No. I.

| Magnetic Coating Composition I | parts |
|---|---|
| Maghemite ($\gamma$-Fe$_2$O$_3$, Hc=325 Oe, average particle length=0.43 $\mu$m, acicular ratio=7:1) | 300 |
| Polyvinyl Alcohol (average degree of polymerization=1500) | 100 |
| Distilled Water | 600 |

The squareness ratio (Br/Bm), surface gloss value, and water-resistance of Samples Nos. A-1 to A-8, and Sample No. I obtained in Example 1 and Comparative Example 1 were measured and the results obtained are shown in Table 2.

Table 2

| Sample No. | Squareness Ratio (1) (Br/Bm) | Surface Gloss Value (2) (%) | Water-resistance |
|---|---|---|---|
| A-1 | 0.800 | 92 | 2 |
| A-2 | 0.790 | 90 | 2 |
| A-3 | 0.785 | 91 | 2 |
| A-4 | 0.790 | 92 | 2 |
| A-5 | 0.800 | 90 | 2 |
| A-6 | 0.800 | 89 | 2 |
| A-7 | 0.785 | 91 | 2 |
| A-8 | 0.790 | 90 | 2 |
| I | 0.690 | 64 | 2 |

Note 1: Squareness ratio (Br/Bm) measured with a vibrating sample type fluxmeter (VSM-III, produced by Toei Kogyo Co., Ltd.).
Note 2: The amount of reflected light having an angle of reflection of 90° relative to the incident light irradiated on the surface of the magnetic layer at an incident angle of 45° (i.e., the angle of reflection relative to the surface of the magnetic layer is 45°) is measured and the surface gloss value (%) indicates the amount of reflected light to the amount of reflected light for a complete mirror surface when the latter is 100%.
Note 3: Value indicating the degree of removal of the magnetic layer when the surface of the magnetic layer is rubbed with cotton gauze soaked with distilled water. The number of rubs is counted until the magnetic layer is removed and transmitted light can be seen through the support, and where the number is 5 or less, (the grade is 1); 5 to 10 times (the grade is 2); 11 to 20 times (the grade is 3); 21 to 30 times (the grade is 4); and where transmitted light cannot be seen through even though it is rubbed more than 50 times, the value is 5.

The results in Table 2 show that the samples in which the amide compounds of the present invention were used as binders had superior surface properties than the sample of Comparative Example 1 in which polyvinyl alcohol was used as a binder.

EXAMPLE 2

| Magnetic Coating Composition B | parts |
|---|---|
| Maghemite ($\gamma$-Fe$_2$O$_3$, Hc=325 Oe, average particle length=0.43 $\mu$m, acicular ratio=7:1) | 300 |
| Amide Compound (see Table 3) | 50 |
| Water-soluble Epoxy Compound (condensate of epichlorohydrin and glycerin, viscosity (25° C)=1.5, epoxy equivalent=1600) | 50 |
| Distilled Water | 650 |

These ingredients were mixed and dispersed sufficiently in a ball mill. This Magnetic Coating Composition B was coated on a 23 $\mu$m thick polyethyleneterephthalate film in a dry thickness of 10 $\mu$m by doctor coating, subjected to magnetic orientation in a D. C. magnetic field of 1800 Oe for 0.5 seconds, dried for 5 minutes using air at 95° C. and 3.3 Kg/m$^2$, and slit to ½ inch widths, whereby a magnetic type was obtained. The samples obtained are designated Sample Nos. B-1 to B-8.

The amide compounds used in these samples are shown in Table 3 below.

Table 3

| Sample No. | Amide Compounds in Magnetic Coating Composition B |
|---|---|
| B-1 | I-1a |
| B-2 | I-2a |
| B-3 | I-3a |
| B-4 | I-4a |
| B-5 | I-5a |
| B-6 | I-6a |
| B-7 | I-7a |
| B-8 | I-8a |

COMPARATIVE EXAMPLE 2

| Magnetic Coating Composition II | parts |
|---|---|
| Maghemite ($\gamma$-Fe$_2$O$_3$, Hc=325 Oe, average particle length=0.43 $\mu$m, acicular ratio=7:1) | 300 |
| Casein (20 wt. % aq. sol.) | 75 |
| Distilled Water | 360 |

After the above ingredients were mixed and dispersed sufficiently in a ball mill, an aqueous emulsion containing a styrene-butadiene copolymer as a resin component (Dow 602, produced by Dow Chemical Co., Ltd.) was added thereto in an amount (solids basis) of 100 parts. The resulting mixture was further dispersed to produce Magnetic Coating Composition II. Hereinafter, in the same manner and conditions as used in Example 2, a ½ inch wide magnetic tape was obtained. This sample is designated Sample No. II.

The squareness ratio, surface gloss value, and water-resistance was measured for each sample in Example 2 and Comparative Example 2, and the results obtained are shown in Table 4 below.

Table 4

| Sample No. | Squareness Ratio (1) (Br/Bm) | Surface Gloss Value (2) (%) | Water-resistance (3) |
|---|---|---|---|
| B-1 | 0.795 | 89 | 5 |
| B-2 | 0.785 | 90 | 5 |
| B-3 | 0.785 | 90 | 5 |
| B-4 | 0.785 | 89 | 5 |
| B-5 | 0.795 | 91 | 5 |
| B-6 | 0.790 | 90 | 5 |
| B-7 | 0.780 | 90 | 5 |
| B-8 | 0.785 | 89 | 5 |
| II | 0.720 | 59 | 5 |

(1), (2) and (3) See Table 2.

The results in Table 4 and those in Table 2 of Example 1 show that the use of the water-soluble epoxy compound in combination with the amide compound as binders improved markedly the water-resistance as compared with the case in which the amide compound alone was used as a binder, and that the sample in which the water-soluble epoxy compound and binder were used, had a superior surface property to that of the sample of Comparative Example 2 in which casein and the aqueous emulsion were used.

EXAMPLE 3

| Magnetic Coating Composition C | parts |
|---|---|
| Cobalt-containing Berthollice Iron Oxide (FeO$_x$, x=1.4, Co=2 atomic %, Hc=625 Oe, average particle length = 0.40 μm, acicular ratio=8:1) | 300 |
| Amide Compound (I-1a) | 30 |
| Water-soluble Epoxy Compound (condensate of epichlorohydrin and glycerin, viscosity (25° C)=1.5, epoxy equivalent=1600) | 30 |
| Distilled Water | 640 |

The above ingredients were mixed and dispersed sufficiently in a ball mill and then the following resin emulsion or resin was added in an amount (solids basis) of 5 parts. The resulting mixture was further sufficiently stirred and dispersed to produce Magnetic Coating Composition C.

Hereinafter, in the same manner and conditions as used in Example 1, four kinds of ¼ inch wide magnetic tapes were produced. These tapes are designates Sample Nos. C-1 to C-4.

Sample C-1: An emulsion prepared by emulsifying an acryl resin (terpolymer, prepared by copolymerizing butyl acrylate and acrylonitrile in a weight ratio of 8:2, and acrylic acid in such a manner that the carboxy group content was 1.2 wt%, and having a degree of polymerization of about 1000) using lauryl alcohol sulfate (emulsifying agent: anionic surface active agent) in such a manner that the solids content of the resin was 38 wt%.

Sample C-2: A water-soluble melamine resin (viscosity (50 wt% aqueous solution, 20° C.): 5 poises; pH: 7.5; specific gravity: 1.1)

Sample C-3: An emulsion prepared by emulsifying a vinyl chloride-vinyl acetate copolymer (copolymerization ratio: 85:15 wt%; OH group content: 3 wt%) in water using polyoxyethylene cetyl ether (emulsifying agent: nonionic surface active agent) in such a manner that the solids content of the resin was 20 wt%.

Sample C-4: A butylated melamine resin containing methylol groups (viscosity (50 wt.% solution in xylol/butanol (1:1 by weight) ,20° C.): 30 poises; acid value: 0.3)

The squareness ratio, surface gloss value, and water-resistance of these sample Nos. C-1 to C-4 were measured and the results obtained are shown in Table 5 below.

Table 5

| Sample No. | Squareness Ratio [1] (Br/Bm) | Surface Gloss Value [2] (%) | Water-resistance [3] |
|---|---|---|---|
| C-1 | 0.780 | 85 | 5 |
| C-2 | 0.785 | 86 | 4 |
| C-3 | 0.785 | 89 | 5 |

Table 5-continued

| Sample No. | Squareness Ratio [1] | Surface Gloss Value [2] | Water-resistance [3] |
|---|---|---|---|
| C-4 | 0.780 | 88 | 4 |

[1], [2] and [3] See Table 2.

The results in Table 5 show that where the water-soluble resin was added as the third component to the binders of the amide resin and water-soluble epoxy compound, good results could be obtained.

EXAMPLE 4

| Magnetic Coating Composition D | parts |
|---|---|
| Maghemite (γ-Fe$_2$O$_3$, Hc=325 Oe, average particle length=0.43 μm, acicular ratio=7:1) | 300 |
| Amide Compound (I-1a) | 50 |
| Distilled Water | 650 |

The above ingredients were mixed and dispersed sufficiently in a ball mill, and a 30 wt% emulsion of an epoxy compound (Adeka Resin EP-4000, produced by Asahi Denka Kogyo K.K., diglycidyl polyether of the propylene oxide adduct of 2,2-bis(4-hydroxyphenyl)-propane; epoxy equivalent: 320) was added thereto in an amount (solids basis) of 50 parts. The resulting mixture was further sufficiently stirred, and dispersed to produce Magnetic Coating Composition D.

In the same manner and conditions as used in Example 1, a ¼ inch wide magnetic tape was obtained. This sample is designated Sample No. D-1.

COMPARATIVE EXAMPLE 3

| Magnetic Coating Composition III | parts |
|---|---|
| Maghemite (γ-Fe$_2$O$_3$, Hc=325 Oe, average particle length=0.43 μm, acicular ratio = 7:1) | 300 |
| 30 wt% Emulsion of Epoxy Compound (the same as in Example 4) (solids basis) | 100 |
| Distilled Water | 650 |

The above ingredients were mixed and dispersed sufficiently in a ball mill to produce Magnetic Coating Composition III. In the same manner as in Example 4, a ¼ inch wide magnetic tape was obtained. This magnetic tape is designated Sample No. III. The characteristics of each of the magnetic tapes obtained in Example 4 and Comparative Example 3 are shown in Table 6.

Table 6

| Sample No. | Squareness Ratio [1] (Br/Bm) | Surface Gloss Value [2] (%) | Water-resistance [3] |
|---|---|---|---|
| D-1 | 0.780 | 84 | 5 |
| III | 0.680 | 53 | 5 |

[1], [2] and [3] See Table 2.

The results in Table 6 show that Sample No. D-1 in which the amide compound of the present invention is used, has a superior surface property to Sample No. III of Comparative Example 3.

From the results of the examples and comparative examples shown above, it can be understood that magnetic tapes produced using amide compounds, amide compounds and water-soluble epoxy compounds, or additionally containing a third component (other water-dispersible resins) as binders according to the present invention have superior squareness ratios and surface gloss values as compared with conventional magnetic tapes (comparative examples) although they have equal water-resistance, and thus that the magnetic tapes of the present invention have a quite excellent surface smoothness.

While the invention has been described in detail and with reference to specific embodiments thereof, it will be apparent to one skilled in the art that various changes and modifications can be made therein without departing from the spirit and scope thereof.

What is claimed is:

1. In a process for producing a magnetic recording medium with a magnetic recording layer comprising coating a magnetic coating composition comprising a ferromagnetic powder, a binder, and a predominantly aqueous coating solvent on a non-magnetic support and drying, the improvement which comprises said binder contains a water-soluble of water-dispersible amide compound selected from the group consisting of (1) an amide compound obtained by reacting an aliphatic carboxylic acid and/or a derivative thereof with a polyamino compound; (2) an acryl-modified amide compound obtained by reacting said amide compound (1) with acrylic acid, methacrylic acid, and/or a derivative thereof; (3) an epoxy-modified amide compound obtained by reacting said amide compound (1) with an epoxy compound; (4) an acryl-epoxy-modified amide compound obtained by reacting said amide compound (1) with acrylic acid, methacrylic acid and/or a derivative thereof and and epoxy compound: (5) an amide compound obtained by reacting a maleic acid-modified unsaturated aliphatic carboxylic acid compound and a polyamino compound: (6) an epoxy-modified amide compound obtained by reacting said amide compound (5) with an epoxy compound: (7) an amide compound obtained by reacted a mixture of a maleic acid-modified unsaturated aliphatic carboxylic acid compound and an aliphatic carboxylic acid and/or a derivative thereof: and (8) an epoxy-modified amide compound obtained by reacting said amide compound (7) with an epoxy compound, wherein said water-soluble or water-dispersible amide compound is present in said binder in an amount of about 30% by weight or more based on total weight of the binder.

2. The process as claimed in claim 1, wherein said binder further includes an epoxy compound containing on the average one or more adjacent epoxy groups in the molecule.

3. The process as claimed in claim 2, wherein the weight ratio of said amide compound to said epoxy compound ranges from about 3:7 to 7:3.

4. A magnetic recording medium produced by the process of claim 3.

5. The process as claimed in claim 1, wherein said predominantly aqueous coating solvent contains at least about 50% by weight water.

6. The process as claimed in claim 1, wherein said predominantly aqueous coating solvent is water.

7. The process as claimed in claim 1 wherein said epoxy compound is selected from the group consisting of polyglycidyl ethers of polyhydric phenols or polyhydric phenol-alkylene oxides, per oxide oxidation type epoxy compounds and urethane modified epoxy compounds.

8. A magnetic recording medium produced by the process of claim 1.

9. The process of claim 1 wherein said amide compound is prepared by condensing an aliphatic carboxylic acid with a polyamino compound.

10. The process of claim 9 wherein said amide compound is modified with acrylic acid, methacrylic acid or a derivative thereof.

11. The process of claim 10 wherein said amide compound is modified with an epoxy compound.

12. The process of claim 9 wherein said acid contains 10 to 20 carbon atoms and said polyamino compound is represented by the following formula (I)

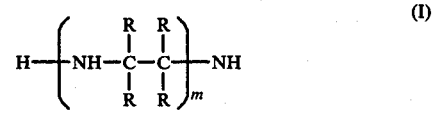

wherein R is a hydrogen atom or an alkyl group containing 5 or less carbon atoms and m is an integer of 6 or less; or by the formula (II)

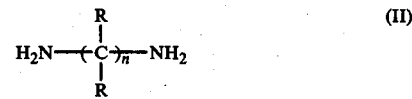

wherein n is an integer of 3 to 12.

13. The process of claim 12 wherein said amide compound is modified with an epoxy compound.

14. The process of claim 9 wherein said binder further includes an epoxy compound containing on the average one or more adjacent epoxy groups.

15. The process of claim 1 wherein said amide compound is prepared by condensing a maleic acid modified unsaturated aliphatic carboxylic acid with a polyamino compound.

16. The process of claim 15 wherein said unsaturated aliphatic carboxylic acid has an iodide number less than 20.

17. The process of claim 16 wherein said amide compound is epoxy modified.

18. The process of claim 1 wherein said amide compound is prepared by condensing an aliphatic carboxylic acid with a poly amino compound.

19. The process of claim 18 wherein said acid contains 10 to 20 carbon atoms and said poly amino compound is represented by the formula (I)

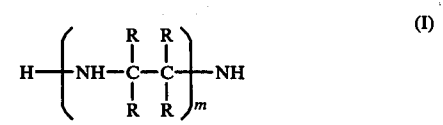

wherein R is a hydrogen atom or an alkyl group containing 5 or less carbon atoms and m is an integer of 6 or less; or by the formula (II)

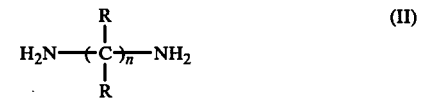

wherein n is an integer of 3 to 12.

20. The process of claim 19 wherein said amide compound is epoxy modified.

21. The process of claim 18 wherein said binder further includes an epoxy compound containing on the average one or more adjacent epoxy groups.

22. The process of claim 1 wherein said amide compound is prepared by condensing a maleic acid modified unsaturated aliphatic carboxylic acid with a poly amino compound.

23. The process of claim 22 wherein said amide compound is modified with acrylic acid, methacrylic acid or a derivative thereof.

24. The process of claim 23 wherein said amide compound is epoxy modified.

25. The process of claim 24 wherein said amide compound is epoxy modified.

26. The process of claim 22 wherein said unsaturated aliphatic carboxylic acid has an iodide number less than 20.

* * * * *